United States Patent [19]

Schrader et al.

[11] Patent Number: 5,491,195
[45] Date of Patent: Feb. 13, 1996

[54] RUBBER MODIFIED POLYSTYRENE

[75] Inventors: David Schrader; Mark E. Soderquist; Mark D. Heires, all of Midland, Mich.

[73] Assignee: The Dow Chemical Company, Midland, Mich.

[21] Appl. No.: 360,868

[22] Filed: Dec. 21, 1994

Related U.S. Application Data

[62] Division of Ser. No. 116,163, Sep. 2, 1993, Pat. No. 5,428,106.

[51] Int. Cl.$^6$ .................................................. C08L 51/04
[52] U.S. Cl. ........................... 525/71; 525/316; 525/315; 525/314; 525/84
[58] Field of Search ........................ 525/71, 314, 315, 525/316, 84

[56] References Cited

U.S. PATENT DOCUMENTS

| | | | |
|---|---|---|---|
| 4,146,589 | 3/1979 | Dupre | 525/53 |
| 4,309,515 | 1/1982 | Corley | 525/316 |
| 4,421,875 | 12/1983 | McKee et al. | 525/315 |
| 4,493,922 | 1/1985 | Echte et al. | 525/315 |
| 4,524,180 | 6/1985 | Sun | 525/71 |
| 4,839,418 | 6/1989 | Schwaben et al. | 525/314 |
| 5,039,714 | 8/1991 | Kasahara et al. | 525/100 |

FOREIGN PATENT DOCUMENTS

| | | |
|---|---|---|
| 0048390 | 3/1982 | European Pat. Off. . |
| 0460541 | 12/1991 | European Pat. Off. . |

*Primary Examiner*—Paul R. Michl
*Assistant Examiner*—Mark L. Warzel
*Attorney, Agent, or Firm*—James B. Guffey; Tai-Sam Choo

[57] ABSTRACT

High impact polystyrene resins are provided having a surprisingly good combination of toughness and gloss characteristics. Such resins contain small (i.e., 0.1 to 0.4 micron) capsule morphology rubber particles in combination with relatively small (i.e., 0.25 to 1 micron) entanglement morphology rubber particles. It has been found that such resins are capable of providing Izod impact strength values in the range of 2.5 to 3.5 ft-lb/in (133.4 to 186.7 J/m) and higher at an overall volume average rubber size of less than 0.4 micron with corresponding gloss values in excess of 90 percent.

13 Claims, No Drawings

RUBBER MODIFIED POLYSTYRENE

CROSS REFERENCE TO RELATED APPLICATIONS

This is a divisional of Applicants' prior application Ser. No. 08/116,163 now U.S. Pat. No. 5,428,106.

BACKGROUND OF THE INVENTION

The present invention pertains generally to impact resistant styrenic resin compositions and to processes for the preparation thereof. More particularly, such invention specifically relates to rubber-modified styrenic polymers in which the dispersed grafted rubbery polymer particles exhibit at least two distinctly different rubber particle morphologies and satisfy certain critical size and content requirements for each of the respective types of rubber particles.

Rubber modified polystyrene resins constitute a generally known category of materials which find practical utility in a wide variety of injection molding and extrusion applications. In recent times, substantial attention has been directed to improving the overall performance properties and characteristics of such resin materials by modifying and controlling the average size, the size distribution and the morphology of the grafted rubber particles that are dispersed throughout the continuous polystyrene matrix phase of such resin compositions.

For example, in Dupre's U.S. Pat. No. 4,146,589 (issued Mar. 27, 1979), there is disclosed a continuous mass polymerization process for preparing a bimodal particle sized high impact polystyrene (HIPS) composition in which a first diene rubber/styrene monomer solution is partially polymerized to form 0.5 to 1 micron-sized dispersed rubber particles; a second diene rubber/styrene monomer solution is partially polymerized to form 2 to 3 micron-sized dispersed rubber particles; and the two resulting partially polymerized mixtures are then combined and further polymerized to the desired final degree of styrene monomer to polymer conversion. According to this particular reference, a good gloss/toughness balance occurs with the resulting resins when the 0.5 to 1 micron particles constitute from 70 to 95 percent of the rubber particles and the remaining 5 to 30 percent is composed of the 2 to 3 micron particles.

Echte et al.'s U.S. Pat. No. 4,493,922 (issued Jan. 15, 1985) is also concerned with bimodal rubber particle-sized HIPS compositions. In particular, the compositions of concern therein are predominantly (i.e., 60 to 95 weight percent on a butadiene weight basis) composed of 0.2 to 0.6 micron rubber particles having a so-called "capsule" morphology (also variously referred to in the art as "single occlusion" or "core/shell" morphology) in combination with from 5 to 40 weight percent (on a butadiene only weight basis) of 2 to 8 micron particles having a cellular or "coil" particle morphology.

Kasahara et al.'s U.S. Pat. No. 5,039,714 is quite similar to the above-discussed Echte et al. patent insofar as it is premised upon a bimodal HIPS composition containing a relatively small (i.e., 0.1 to 0.6 micron) particle size dispersed rubber component having a single occlusion (or "capsule") morphology and a relatively larger dispersed rubber component having a cellular morphology which Kasahara et al. also refers to as a "salami" morphology. Kasahara et al. does differ from Echte et al. in that the volume averaged particle size of its cellular particle component is required to be from 0.7 to 1.9 micron.

Other known types of dispersed rubber particle morphology which can be obtained under the proper graft polymerization conditions in the preparation of rubber modified polystyrene resins include the so-called entanglement (or "labyrinth") morphology (i.e., wherein polystyrene inclusions within the rubber particle appear as irregularly curved, elongated domains of polystyrene separated by relatively thinner elongated layers of rubber) and the so-called concentric shell or "onion skin" morphology which is characterized by alternating generally spherical or elliptical polystyrene layers and rubber layers.

HIPS resins having these latter types of rubber particle morphology are described in some detail in published European Application Number 0048390 (Mar. 31, 1982) and are taught as being particularly effective for use in blends with polyphenylene ether resins. According to this reference, the overall average particle size of the dispersed rubber particles should be in the range of from 0.5 to 3 micron.

More recently (i.e., in published European Application Number 0460541 of Dec. 11, 1991), entanglement rubber particle morphology has been taught as being an equivalent alternative to cellular rubber particle morphology in the context of certain trimodal particle-sized HIPS compositions. In accordance with this latter reference, an improved property balance as between gloss and impact strength is provided by HIPS compositions which contain from 40 to 98 weight percent of 100 to 600 nm (0.1 to 0.6 micron) capsule morphology rubber particles in combination with from 2 to 60 weight percent of a mixture of cellular and/or entanglement morphology rubber particles from 1 to 60 weight percent of which have a size of from 200 to 1,200 nm (0.2 to 1.2 micron) and 40 to 99 weight percent of which have a size of from 1,200 to 8,000 nm (1.2 to 8 micron).

SUMMARY OF THE INVENTION

In connection with the foregoing, it has heretofore been generally accepted, conventional wisdom that it was essential in order to obtain good toughness (e.g., Izod impact strength) properties in mass, solution or mass/suspension polymerized high impact polystyrene (HIPS) resin compositions that there be present therein at least some minimum portion of a dispersed rubber particle population in the size range from 1 to 2 microns or greater.

Surprisingly, however, it has now been discovered that HIPS resin materials containing dispersed rubber particles having entanglement (or "labyrinth") or concentric shell (or "onion skin") morphology exhibit very good Izod impact strength characteristics at overall volume average rubber particle sizes of less than 1 micron (and even at overall volume average sizes of less than 0.5 or 0.6 micron) and even under circumstances (i.e., particle size distributions) wherein there are essentially no rubber particles present having a size of one micron or larger.

One very key significance or benefit of this discovery resides in what it means from a practical standpoint in terms of the gloss/impact strength balance which can be achieved with the HIPS resins in question. Thus, for example, the entanglement morphology-based HIPS resins hereof are capable of providing at a butadiene rubber content of 8.5–9 weight percent (on a polybutadiene weight basis), an 80+ percent 60° Gardner gloss value (injection molded test specimen) in combination with a 2 ft lb/in (106.7 J/m) Izod impact strength as determined using a compression molded test specimen. In contrast, a comparable (i.e., 8.5 weight percent polybutadiene-containing) conventional monomodal cellular particle-based HIPS resin will typically provide an Izod impact strength of only about 1 ft lb/in (53.35 J/m) or less at the average particle size that is required (i.e., about 0.5 micron) to obtain an 80 percent gloss value. Another noteworthy feature of the subject entanglement morphology-based resins is that they are capable of being produced on conventional, commercial scale continuous mass or solution polymerization trains at rubber contents (again on a polybutadiene weight basis) up to about 15 weight percent or more. When so produced, such resins are capable, at the relatively small particle sizes which are hereinafter more fully discussed, of providing 90+ (injection molded) percent gloss values in combination with Izod impact strengths (compression molded) of about 4.5 ft lb/in (240 J/m) or more.

In light of the foregoing, the present invention can be viewed as being in one of its aspects an improved rubber-modified monovinylidene aromatic polymer composition which has a very distinctive and highly advantageous combination of impact strength and gloss characteristics. Generally speaking, said composition comprises, on a total composition weight basis, from about 90 to about 55 weight percent of a rigid monovinylidene aromatic polymer matrix and, dispersed within said matrix, from about 10 to about 45 weight percent of grafted and occluded 1,3-alkadiene-based rubber particles, said particles being composed, on a rubber particle weight basis, of:

a. from 25 to about 80 weight percent of rubber particles having a capsule morphology and a volume average particle size of from 0.1 to 0.4 micron; and
 b. from about 75 to about 20 weight percent of rubber particles having an entanglement morphology and having a volume average particle size of from about 0.25 to 1 micron.

In another of its aspects, the present invention also takes the form of a method for preparing the above-described entanglement rubber particle morphology-based rubber-modified polymer compositions. In this latter regard, such invention is characterized as being a method for the preparation of the above-described rubber-modified monovinylidene aromatic polymer composition, said method comprising:

a. dissolving from about 5 to about 30 parts by weight of a 1,3-alkadiene/monovinylidene aromatic block copolymer rubber in from about 95 to about 70 parts by weight of a monovinylidene aromatic monomer, said block copolymer rubber being one which has from about 15 to about 40 weight percent of monovinylidene aromatic monomer copolymerized therein;
 b. polymerizing the resulting rubber/monomer solution at a temperature of from about 50° to about 210° C., in the presence of from 0 to about 1000 parts per million by weight of a polymerization initiator and from 0 to about 2000 parts per million by weight of a chain transfer agent and under agitation conditions sufficient to provide capsule morphology and entanglement morphology rubber particles in the above-specified size ranges; and
 c. thereafter recovering the resulting rubber-modified monovinylidene aromatic polymer product.

As used herein throughout the remainder of this document, the terminology "entanglement morphology" shall be used to generically mean or connote the various known non-cellular HIPS rubber particle morphologies that are commonly referred to in the art as "entanglement", "labyrinth", "coil", "onion skin" or "concentric circle" morphology.

Similarly, the term "capsule" morphology shall be used throughout the remainder hereof to generically connote those known very small rubber particles that have a morphology which is commonly also referred to in the art as "single occlusion" or "core/shell" morphology.

DETAILED DESCRIPTION OF THE INVENTION

The rubber-modified monovinylidene aromatic polymers cunan a predominant amount (e.g., 55–90 percent) by weight of a rigid continuous matrix phase which is composed, in polymerized form, of one or more monovinylidene aromatic monomers and, dispersed within said continuous matrix phase, a minor amount (e.g., 10 to 45 percent) by weight of discrete rubbery polymer particles that are composed of an elastomeric polymer material or "substrate" having portions of monovinylidene aromatic polymer chemically grafted thereto and physically occluded therein and that satisfy the particle size and morphological criterion which are set forth above.

Monovinylidene aromatic monomers suitable for use herein include those corresponding to the formula

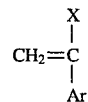

wherein X is hydrogen or an alkyl radical containing from 1 to 3 carbon atoms and wherein Ar is phenyl, alkylphenyl, halophenyl or alkylhalophenyl. Examples of such monomers thus include styrene, alpha-methylstyrene, alpha-ethylstyrene, vinyl toluene, alpha-methylvinyltoluene, o- and p-ethylstyrene, 2,4-dimethylstyrene, o-bromostyrene, p-chlorostyrene, 2,4-dichlorostyrene and the like. Styrene itself is especially preferred on the basis of its cost and ready availability.

Elastomeric polymer materials which are suitable for use in the preparation of these rubber-modified polymer compositions include rubbery 1,3-alkadiene polymers having a second order transition temperature of 0° C. or less (preferably −20° C. or less) and thus include 1,3-alkadiene homopolymers and copolymers containing, in polymerized form and on a elastomeric polymer weight basis, from about 60 to 100 percent of a 1,3-alkadiene monomer (e.g., butadiene, isoprene, etc.) and from 0 to about 40 weight percent of one or more monoethylenically unsaturated comonomers such as styrene, acrylonitrile, alpha-methylstyrene, methacrylonitrile, methyl methacrylate, ethyl acrylate, etc.

Particularly preferred elastomeric polymer substrates for use herein are 1,3-alkadiene/monovinylidene aromatic (e.g., 1,3-butadiene/styrene) block copolymer rubbers which contain from about 60 to about 85 weight percent of the 1,3-alkadiene monomer block copolymerized with from about 15 to about 40 weight percent of one or more monovinylidene aromatic monomers. Such materials are especially preferred by virtue of the relative ease by which they can be caused to have the desired capsule and entanglement particle morphologies in commercial scale bulk or solution graft polymerization processes and equipment and at commercially feasible initiator and chain transfer agent usage levels.

The indicated rubber-modified monovinylidene aromatic polymers are conveniently prepared by dissolving from about 5 to about 30 parts by weight of the aforementioned elastomeric polymer material in from about 95 to about 70 parts by weight of the monovinylidene aromatic monomer and polymerizing the resulting elastomer/monomer solution at an elevated temperature in the presence of from 0 to about 1000 parts per million (by weight) of a polymerization initiator and from 0 to about 2000 parts per million (by weight) of a chain transfer agent and under agitation conditions sufficient to provide two different types of grafted/occluded rubber particles one of which has capsule morphology and the other of which has entanglement morphology and each of which fall, respectively, within the above specified size ranges.

If desired, the polymerization reaction mixture can also contain from about 1 to about 30 (preferably from about 5 to about 20) weight percent (on a total reaction mixture weight basis) of an inert solvent or diluent such as ethylbenzene, etc.

The indicated polymerization process will typically be conducted at a temperature of from about 50° to about 210° C. and is preferably conducted at a temperature in the range of from about 90 to about 190 (more preferably about 105° to about 185° C.

Suitable polymerization initiators for use herein include any of the known oil-soluble initiators which decompose to form free radicals such as the various known peroxide initiators such as benzoyl peroxide, dicumyl peroxide, di-tert-butyl peroxide, etc.; azo compounds such as azobutyronitrile and the like. As noted above, such initiators are typically employed in an amount ranging from 0 to 1000 parts per million (ppm). Preferably, they are used in amounts ranging from about 0 to about 500 (more preferably 0 to about 200) ppm.

Chain transfer agents suitable for use herein include those which are already well known to be useful in the preparation of styrenic polymers. Exemplary of such known chain transfer agents are organic thiols and dithiols such as butyl mercaptan, n- or t-dodecyl mercaptan, lauryl mercaptan, stearyl mercaptan, benzyl mercaptan, cyclohexylmercaptan, 1,6-hexanedithiol, etc.; halogenated hydrocarbons such as carbon tetrachloride, carbon tetrabromide, bromotrichloromethane and the like. Typically, said chain transfer agents are used in an amount ranging from 0 to 2000 ppm and, preferably in amounts ranging from 0 to 1500 (especially 0 to 1000) ppm.

While the level of the chain transfer agent and the initiator chosen for use herein can individually be zero for either one of them, it should be noted that one or the other of them will typically be used in some minimum non-zero amount.

In connection with the foregoing, it can also be noted that combined initiator and chain transfer agent usage levels play a key role in controlling the rubber particle size and morphology within the rubber-modified styrenic resins obtained from the subject graft polymerization process. Within such process, the use of increased initiator levels generally tend to increase the level of grafting on the rubber particle and makes it easier to obtain the desired entanglement and capsule rubber morphologies when using styrene/butadiene block copolymer rubbers containing relatively low styrene content. Increased usage levels of chain transfer agent generally tend to result in larger overall average grafted rubber particle size within the resulting HIPS resins. Also, within such process, it can be noted that the particle sizing mechanism appears to be predominantly a chemical sizing phenomenon in which agitation rate at the point of phase inversion plays only a minor role in determining and/or controlling the size of the resulting grafted rubber particles.

The amount of chain transfer agent and polymerization initiator used also serves to control the molecular weight of the monovinylidene aromatic polymer (e.g., polystyrene) formed during the indicated graft polymerization process. Typically, the free (i.e., ungrafted) monovinylidene aromatic polymer matrix formed during said polymerization will have a weight averaged molecular weight (Mw) of from about 130,000 to about 250,000 (preferably from about 150,000 to about 220,000); a number averaged molecular weight (Mn) from about 40,000 to about 100,000 (preferably from about 45,000 to about 75,000); and Mw:Mn ratio of from about 2 to about 5 (preferably from about 2.2 to about 3.5).

One further, and rather surprising, feature of the subject rubber-modified monovinylidene aromatic polymer compositions is that they exhibit notably good toughness characteristics (e.g., Izod impact strength values) even at relatively low matrix phase molecular weights (e.g., in the range of Mw=130,000 to about 150,000 and Mn=35,000 to about 50,000) at which conventional cellular rubber morphology-based HIPS resins tend to exhibit little or no toughness.

The total rubber content of the rubber modified monovinylidene aromatic polymer compositions hereof, stated on a 1,3-alkadiene weight basis only, is typically from about 5 to about 30 (preferably from about 8 or 10 to about 20 or 25) weight percent on a total rubber modified polymer composition weight basis.

The dispersed, grafted and occluded rubber particles themselves will typically have, per one part by weight of the starting point ungrafted rubber, from about 0.5 to about 4 or 5 (preferably from 1 or 1.5 to about 3 or 4) parts by weight of monovinylidene aromatic polymer grafted thereto and occluded therein. Accordingly, the total or combined weight of the grafted and occluded rubber particles (i.e., including polymerized, grafted and occluded monovinylidene aromatic polymer portions thereof) will typically constitute from about 10 to about 45 (preferably 15 or 20 to about 35, 40 or 45) weight percent of the overall rubber modified polymer composition with the remainder thereof (i.e., about 55 to about 90, preferably from about 55, 60 or 65 to about 75 or 80, weight percent) being free (i.e., non-grafted and non-occluded) matrix material.

The indicated total weight of the grafted and occluded rubber particles (i.e., including the weight fraction thereof attributable to grafted and occluded monovinylidene aromatic polymer) will correspond generally to the parameter which is commonly referred to as "gel content" and which is typically determined experimentally by dissolving a known quantity of the rubber-modified resin of interest (or more specifically that portion of it which will dissolve) in a suitable solvent for the monovinylidene aromatic polymer matrix resin (typically toluene); separating the undissolved portion thereof from the polymer/solvent solvent solution; drying the undissolved residue and determining the weight thereof. The "gel content" thus determined (as a fraction or percentage of the initial dry sample weight) corresponds to the combined content of the insoluble, crosslinked rubber constituent and that portion of the grafted and occluded monovinylidene aromatic polymer material that is chemically grafted thereto, or sufficiently physically entrapped therein, so as to remain with the insoluble rubber material.

As has been noted above, the dispersed grafted and occluded rubber particles of the subject polymer compositions will be present in two distinct particle morphologies, namely one group of particles having a so-called capsule (or single occlusion) morphology and a volume averaged size in the range of from about 0.1 to about 0.4 micron and a second group having an entanglement (or onion skin) morphology and having a volume averaged particle size in the range of from about 0.25 to about 1 micron.

Typically, the individual particles making up the first group (i.e., the capsule morphology population) will individually range in size from as little as 0.05 micron to as much as 1 micron with the overall volume averaged size taken over all members of said group being in the 0.1 to 0.4 micron range noted above. Preferably, the volume average size of the indicated capsule morphology group or population will be from about 0.2 to about 0.35 micron.

Generally speaking, the capsule morphology rubber particles will as a group constitute from about 25 to about 80 weight percent of the grafted/occluded rubber particles contained within the subject compositions. More preferably, however, said capsule morphology particles will constitute a minor portion (e.g., from about 25 to about 45 or 50, especially from about 25 to 40, weight percent) of the combined weight of all of the grafted and occluded rubber particles contained therein.

The entanglement (or onion skin) morphology rubber particles hereof typically range, in terms of their individual particle size, from about 0.2 to about 3 micron in diameter and, as a group, generally have a volume averaged size in the range of from about 0.25 to 1 micron. Preferably such entanglement particles have a volume average size in the range of from about 0.3 or 0.35 to about 0.8 microns. It is also generally preferred that the entanglement particle group or population be substantially free (e.g., contain, on an entanglement particle weight basis less than 10 percent, preferably less than 5 percent and most preferably less than 0.5 percent) of particles having a particle diameter in excess of 1 micron.

While the indicated entanglement morphology rubber particles can generally constitute anywhere from about 20 to about 75 percent of the total weight of grafted/occluded rubber particles contained within the subject resin composition, it is generally preferred that such entanglement particles constitute a predominant portion (e.g., from about 50 or 55 to about 75, especially from 60 to about 75 weight percent) of the combined weight of the entanglement and capsule morphology particles contained therein.

Another preferred criterion associated with an especially preferred subcategory of the subject polymer compositions is that the overall volume averaged particle size (i.e., taken over both of the above-described capsule and entanglement morphology particles) be less than 0.6 micron, most preferably about 0.5 micron or less and especially less than 0.5 micron. Satisfaction of this particular criterion facilitates the obtention of extremely good gloss properties while still obtaining excellent impact strength characteristics.

In one especially preferred embodiment hereof, the above-described dual rubber particle-based (i.e., combined capsule morphology/entanglement morphology) resin composition further comprises a relatively minor amount (e.g., from about 1 to about 25, preferably from about 2 to about 15, weight percent on a total grafted/occluded rubber particle weight basis) of conventional cellular morphology grafted/occluded 1,3-alkadiene-based rubber particles.

Typically, the indicated cellular morphology rubber particles that are optionally employed herein will be characterized as having an overall size distribution ranging from about 0.3 (preferably about 0.6) micron at its small end up to about 5 (preferably about 4) micron at the large end and will have an overall volume average particle size (i.e., taken only over those particles having a cellular morphology) of from about 0.6 to about 1.2 (preferably about 0.8 to 1.0) micron.

The above described ternary (i.e., capsule+entanglement+cellular) morphology embodiment can be employed, if desired, in the context of the full range of binary capsule/entanglement morphology-based compositions that are discussed above. However, such embodiment is most beneficially employed in the context of those combined capsule/entanglement morphology compositions hereof in which the capsule morphology particles have a volume average diameter toward the low end of their generally applicable size range (i.e., thus being in the 0.1 to 0.2 or 0.25 micron average size range) and especially when said relatively small-sized capsule morphology particles constitute a predominant proportion (e.g., from about 50 to about 80 weight percent) of the combined weight of the grafted/occluded entanglement and capsule morphology particles.

The further inclusion of the indicated cellular morphology rubber particles is also generally beneficial and preferred in those instances wherein the entanglement rubber particles have a volume average particle size within the lower reaches of its generally applicable average size range (i.e., thus being in the 0.25 to 0.35 or 0.4 micron average size range).

In preparing the above-described ternary capsule/entanglement/cellular rubber morphology-based resin compositions, the indicated cellular morphology grafted/occluded rubber particle constituent can, if desired, be introduced thereto by simply extrusion compounding the above-described binary capsule/entanglement morphology-based compositions hereof with the desired amount (on a grafted/occluded rubber particle weight basis) of a separately prepared conventional 1,3-alkadiene homopolymer or copolymer rubber-modified styrenic resin having a monomodal particle size distribution and a cellular rubber particle morphology and having the desired volume average rubber particle size within the above-specified size range.

On the other hand, the indicated cellular morphology rubber particle constituent can also be prepared in-situ as part of a single overall graft copolymerization process. In such case a minor amount (e.g., 2 to 20 weight percent) of a solution of 1,3-alkadiene (especially 1,3-butadiene) homopolymer or copolymer rubber in the monovinylidene aromatic monomer can simply be fed, in non-polymerized or partially graft polymerized (phase inverted or not) form, into the above-described binary capsule/entanglement morphology-based resin graft polymerization process at a point therein following, and preferably only shortly after, phase inversion of the main polymerization mixture and thereafter completing the polymerization process under agitation conditions sufficient to cause the cellular morphology particles resulting from the post-inversion addition of the rubber/monomer feed stream solution to be in the desired average size range.

Rubbery 1,3-alkadiene polymers suitable for use in the in-situ formation of the cellular morphology grafted/occluded rubber polymer particles include those having a second order transition temperature of 0° C. or less (especially −20° C. or less) and include 1,3-alkadiene homopolymers and copolymers containing from about 60 to 100 weight percent of a 1,3-alkadiene monomer (especially 1,3-butadiene) and from 0 to about 40 weight percent of one or more monoethylenically unsaturated monomers such as styrene, acrylonitrile, methacrylonitrile, methyl methacrylate, etc.

Typically, the post-phase inversion monomer/rubbery polymer feed stream solution employed for the in-situ formation of the cellular rubber particle will have a rubbery polymer content in the range of from about 5 to about 30 (especially from about 8 or 10 to about 20 or 25) weight percent on a post-phase inversion feed stream weight basis and will be added to the main binary capsule/entanglement resin polymerization process at a point therein when the main feed stream has achieved a monovinylidene aromatic monomer-to-polymer conversion of from about 10 to about 60 (especially from about 25 to about 45) percent.

The actual determination of the rubber particle morphology and particle size characteristics of the subject polymer compositions is readily accomplished using conventional Transmission Electron Micrograph (TEM) techniques on thin slices of the polymer material in question and known osmium tetraoxide staining techniques.

When so-analyzed and characterized (typically at a magnification in the range of from 9,000 to 30,000 times), the above specified separate particle morphologies will be readily observed and recognized in the resulting photomicrographs. These same photomicrographs can then also be used to ascertain (a) the outermost size range limits for the individual members of the different types of rubber particles, (b) the volume averaged sizes of the different morphology groups taken separately, and (c) the overall volume average size of all rubber particles taken collectively.

In determining the different volume averaged sizes noted above, the following formula is applied to the photomicrograph image for the particular group or population of particles which is of interest:

$$D_v = \frac{\Sigma NiDi^4}{\Sigma NiDi^3}$$

wherein

Dv=the volume averaged diameter; and

Ni=the number of particles having the specific morphology of interest and having a diameter in given size range, Di.

The polymer compositions hereof are fully usable with the full spectrum of conventional additives (e.g., pigments, dyes, plasticizers, lubricants, stabilizers, mold release agents, etc.) that have long been used with previous types of HIPS compositions. Moreover, these new compositions are suitable for use in a wide variety of practical injection molding and extrusion applications including those wherein conventional HIPS resins have been used historically as well as in many more demanding applications in which more expensive resins (e.g., ABS, etc.) have heretofore been required.

The present invention is further illustrated and understood by reference to the following examples thereof in which all parts and percentages are on a weight basis unless otherwise specifically indicated.

Within such examples, the various properties that are measured are determined as follows:

| Melt Flow Rate | ASTM D-1238-86 at 200° C. and 5.0 Kg. |
|---|---|
| Izod Impact Strength | ASTM D-256-84 using compression molded test specimens. |
| Tensile Properties | ASTM D-638-87b |
| Gloss | 60° Gardner gloss taken on injection molded test specimens. |

General Procedures for the Working Examples:

A series of HIPS resins having a combined capsule/entanglement rubber morphology are made in a three stirred tube reactor polymerization system connected in a series arrangement. A styrene/butadiene block copolymer rubber is used and is dissolved in styrene and then pumped to the reactor system. Ethyl benzene, a diluent, is added prior to the entry into the reactors. Initiator and chain transfer agent are added to control the amount of polystyrene grafting to the rubber and the molecular weight of the grafted material. The initiator and chain transfer agent also control the molecular weight of the ungrafted polystyrene matrix resin. The initiator is either added directly to the feed or is pumped into a transfer line running between the rubber dissolver and the initial reactor of the reactor system. The chain transfer agent is either added with the initiator or in the early stages of the first reactor. The combination of initiator and chain transfer agent serves as the dominant factor in controlling the rubber morphology and the rubber particle sizes. Agitation of the polymerizing mass during phase inversion has less significant influence on the rubber morphology and the rubber particle size than the indicated initiator and chain transfer effects. After the partially polymerized reaction mixture undergoes phase inversion (typically at a conversion of from 15 to 60 percent of styrene monomer to polymer) and the rubber morphology and rubber particle size are set, the polystyrene matrix molecular weight can be controlled by the addition of additional chain transfer agent. This is usually done when the polymerizing mixture is between 50 and 60% solids. The styrene polymerization continues in the second and third reactors until the solids are approximately 75–85%. The temperature profile of the entire reactor system increases from 110° C. at the beginning to approximately 180° C. at the end. The temperature range of the first reactor is approximately 110° C. to 138° C., the second reactor ranges from 138° C. to 145° C. and the third reactor ranges from 145° C. to 180° C. The polymerized mass then enters a devolatilization unit to remove the diluent and residual styrene and to crosslink the rubber.

EXAMPLE 1

A sample of HIPS was made having a 14.6 weight percent butadiene content using about 21 weight percent of a 70/30 butadiene/styrene block copolymer rubber, 3.25 weight percent mineral oil, and with the balance being styrene. The resin was made with a linear three stirred tube reactor system. Each reactor had three temperature control zones. The main feed stream composition was 6.3 weight percent ethyl benzene, 2.5 weight percent mineral oil, 16.5 weight percent 70/30 block copolymer, and with the balance being styrene monomer. A n-dodecyl mercaptan, n-DDM feed stream consisting of 98.4 weight percent ethyl benzene and 1.6 weight percent n-DDM was added to the first zone of the first stirred tube. The feed rate of the main feed was 0.75 lb/hr (340.2 g/hr) and the n-DDM feed rate was 0.034 lb/hr (15.42 g/hr). The temperature running from zone number one to zone number nine was 113°, 127°, 135°, 138°, 140°, 142°, 144°, 146° and 150° C., respectively. The properties of the resulting HIPS resin are set forth in Table I below.

EXAMPLE 2

A sample of HIPS was made having 13.4 weight percent butadiene content using about 19.1 weight percent of a 70/30 butadiene/styrene block copolymer, 2.8 weight percent mineral oil, and with the balance being styrene. The resin was made using a linear stirrer tube reactor system. Each reactor consists of three temperature zones. The main feed stream composition was 7.5 weight percent ethyl benzene, 2.4 weight percent mineral oil, 15.6 weight percent block copolymer, and with the balance being styrene monomer. The main feed rate was 8614 g/hr. A feed stream consisting of 1 weight percent 1,1-di(t-butylperoxy)cyclohexane, 1 weight percent mineral oil with the balance of ethyl benzene was added to the first zone at the rate of 43 g/hr. A feed stream consisting of 11.1 weight percent octadecyl 3,5-di-tert-butyl-4-hydroxyhydrocinnamate, 3.2 weight percent n-dodecyl mercaptan, with the balance of ethyl benzene was added to the first zone at a rate of 94 g/hr. A feed stream consisting of ethyl benzene was added to the eighth zone at a rate of 451 g/hr. The temperatures for zones 1 through 9 were 115°, 120°, 124°, 127°, 135°, 142°, 148°, 156° and 165° C. respectively. The reaction mixture was devolatilized in two stages, first at 184° C. and 850 mm Hg and the second at 246° C. and 21 mm Hg. The properties of the resulting resin material are found in Table I below.

EXAMPLES 3–8

Several additional HIPS resin samples were prepared using the equipment and procedures set forth in Examples 1 and 2 above.

The particle size and distribution and the relative proportion of capsule morphology particles and entanglement morphology particles was varied among these examples by varying the amount of initiator [1,1di-(t-butylperoxy) cyclohexane] and chain transfer agent (n-dodecyl mercaptan) employed therein.

The properties of the resulting resin samples are summarized in Table I below.

As can be seen from the results in Table I, the best Izod impact strength appears to be obtained in the Example 1 resin at an overall volume average particle size of about 0.6 micron. As can also be seen, however, excellent impact strength properties are also obtained in Examples 2 and 3 at an overall volume average particle size of about 0.4 to 0.5 microns while giving notably higher gloss values.

By way of comparison, it has been observed that conventional monomodal particle size distribution cellular rubber morphology-based HIPS resins, at a butadiene content of 8.5 weight percent, must typically have a volume average particle size of about 2.5 to 3 microns in order to attain an Izod impact strength of 133.4 J/m (2.5 ft-lb/in). Such conventional resins typically exhibit a 60 degree Gardner gloss value of less than 50 percent at the indicated 2.5 to 3 micron average rubber particle size value.

Conversely, it has also been observed that conventional cellular rubber particle morphology-based HIPS resins having a monomodal particle size distribution can (at the indicated 8.5 weight percent butadiene content) be caused to attain gloss values in the 80 to 90 range by decreasing the volume average particle size thereof to about 0.5 micron. However, in that small rubber particle size range, the resulting conventional HIPS resins typically exhibit an Izod impact strength of only about 53.35 J/m (1 ft-lb/in) or less.

TABLE I

|  | Example 1 | Example 2 | Example 3 | Example 4 | Example 5 | Example 6 | Example 7 | Example 8 |
| --- | --- | --- | --- | --- | --- | --- | --- | --- |
| Composition |  |  |  |  |  |  |  |  |
| PBD (wt. percent) | 14.6 | 13.4 | 13.4 | 14.6 | 8.5 | 13.5 | 14.6 | 14.6 |
| SBR (wt. percent) | 21 | 19.1 | 19.1 | 21 | 12.1 | 19.3 | 21 | 21 |
| Mineral Oil (wt. percent) | 3.25 | 2.8 | 2.9 | 3.25 | 3.0 | 2.9 | 3.25 | 3.25 |
| Properties |  |  |  |  |  |  |  |  |
| Ty (m Pa) | 19.6 | 19.0 | 19.2 | 20.5 | 22.5 | 21.6 | 24.4 | 17.8 |
| Tr (m Pa) | 15.2 | 15.0 | 15.4 | 16.0 | 17.4 | 16.7 | 18.8 | 13.4 |
| Tm × $10^3$ (m Pa) | 1.38 | 1.43 | 1.43 | 1.46 | 1.89 | 1.61 | 1.81 | 1.25 |
| Elongation (percent) | 12 | 21 | 14 | 13 | 26 | 17 | 25 | 17 |
| Izod (J/m) | 246.5 | 128.0 | 176.1 | 149.9 | 69.4 | 37.3 | 28.8 | 131.8 |
| Melt Flow Rate (g/10 min) | 4.27 | 3.1 | 3.0 | 3.30 | 3.1 | 2.9 | 2.00 | 8.74 |
| Vicat (°C.) | 99.4 | 101.2 | 101.6 | 99.9 | 102.5 | 101.6 | 100.8 | 98.2 |
| Mw | 170100 | 181100 | 183400 | 174100 | 203500 | 193300 | 222500 | 137200 |
| Mn | 68770 | 70420 | 68770 | 70420 | 85090 | 81720 | 81720 | 43690 |
| Mz | 313000 | 318100 | 313000 | 318100 | 354000 | 417000 | 417000 | 279300 |
| Gloss | 84 | 93 | N.D.* | N.D.* | 99 | 97 | N.D.* | N.D.* |
| Capsule Size[1] (micron) | 0.27 | 0.26 | 0.25 | 0.26 | 0.23 | 0.20 | 0.18 | 0.36 |
| wt. % of Capsule Particles | 37.9 | 33.2 | 33.5 | 44.7 | 68.3 | 53.9 | 77.9 | 27.3 |
| Entanglement Size[2] (micron) | 0.64 | 0.46 | 0.43 | 0.41 | 0.41 | 0.29 | 0.27 | 1.02 |
| wt. % of Entanglement Particles | 62.1 | 66.8 | 66.5 | 55.3 | 31.7 | 46.1 | 22.1 | 72.7 |
| Overall Vol. Ave. Particle Size[3] (micron) | 0.57 | 0.42 | 0.40 | 0.36 | 0.34 | 0.25 | 0.21 | 0.95 |
| Initiator** (ppm) | 0 | 50 | 50 | 0 | 200 | 100 | 200 | 0 |
| Chain Transfer Agent*** (ppm) | 700 | 350 | 350 | 200 | 200 | 400 | 450 | 1900 |

*N.D. = Not Determined
**1,1 Di(t-butylperoxy)cyclohexane
***n-dodecyl mercaptan
[1]Volume average size of capsule morphology particles.
[2]Volume average size of entanglement morphology particles.
[3]Volume average size of all rubber particles in the Composition.

EXAMPLE 9

A sample of HIPS was made having a 10.5 weight percent butadiene content using about 15 weight percent of a 70/30 butadiene/styrene block copolymer rubber, 3.25 weight percent mineral oil, and with the balance being styrene. The resin was made with a linear three stirred tube reactor system. Each reactor had three temperature control zones. The main feed stream composition was 8.7 weight percent ethyl benzene, 2.5 weight percent mineral oil, 11.9 weight percent 70/30 block copolymer, 100 ppm 1,1-di(t-butyl peroxy) cyclohexane and with the balance being styrene monomer. A n-dodecyl mercaptan, n-DDM, feed stream consisting of 99.77 weight percent ethyl benzene and 0.23 weight percent n-DDM was added to the first zone of the first stirred tube. The feed rate of the main feed was 0.75 lb/hr (340.2 g/hr) and the n-DDM feed rate was 0.034 lb/hr (15.42 g/hr). The temperature running from zone number one to zone number nine was 110°, 117°, 128°, 138°, 142°, 144°, 147°, 150° and 155° C., respectively. The properties of the resulting HIPS resin are set forth in Table II below.

EXAMPLE 10

Example 9 was substantially repeated with the exception that a second rubber/styrene monomer feed stream solution was added to zone number 5 of the nine zone, 3 reactor system (i.e., at a point in the polymerization process at which about 43 percent of the styrene monomer originally present in the main feed stream had been converted to styrene polymer).

The second feed stream had the same compositional make-up as the main feed stream and was fed to the polymerization process at a rate of 50 g/hr.

The resulting HIPS resin was one which contained three different rubber particle morphologies (i.e., capsule, entanglement and cellular) and had the properties and characteristics as summarized in Table II below.

While the present invention has been described and illustrated with reference to particular embodiments and examples thereof, such is not to be interpreted as in any way limiting the scope of the instantly claimed invention.

TABLE II

| | Example 9 | Example 10 |
|---|---|---|
| Composition | | |
| PBD (et. percent) | 10.5 | 10.5 |
| SBR (wt. percent) | 15 | 15 |
| Mineral Oil (wt. percent) | 3.25 | 3.25 |
| Properties | | |
| Ty (m Pa) | 23.1 | 21.9 |
| Tr (m Pa) | 17.7 | 15.5 |
| Tm × 10$^3$ (m Pa) | 2.09 | 2.07 |
| Elongation (percent) | 9 | 23 |
| Izod (J/m) | 25.8 | 90.2 |
| Melt Flow Rate (g/10 min) | 4.6 | 4.3 |
| Vicat (°C.) | 100.9 | 102.2 |
| Mw | 192600 | 189100 |
| Mn | 54400 | 65000 |
| Mz | 376800 | 362600 |
| Gloss | 100 | 96 |
| Capsule Size (micron)[1] | about 0.2 | about 0.2 |
| wt. % of Capsule Particles | about 55 | about 48 |
| Entanglement Size (micron)[2] | about 0.3 | about 0.3 |
| wt. % of Entanglement Particles | about 45 | about 39 |
| Cellular Size (micron)[4] | None | about 0.9 |
| wt. % of Cellular Particles | None | 13 |
| Overall Vol. Ave. Particle Size | about 0.25 | about 0.33 |

TABLE II-continued

| | Example 9 | Example 10 |
|---|---|---|
| (micron)[3] | | |
| Initiator (ppm)** | 100 | 100 |
| Chain Transfer Agent*** | 100 | 100 |

Footnotes [1-3],  and * See Table I above.
[4]Volume average size of cellular rubber particles.

What is claimed is:

1. A method for the preparation of a rubber-modified monovinylidene aromatic polymer composition said composition comprising, on a total composition weight basis, from about 90 to about 55 weight percent of a rigid monovinylidene aromatic polymer matrix and from about 10 to about 45 weight percent of grafted and occluded 1,3-alkadiene-based rubber particles dispersed within said matrix wherein from about 25 to about 80 weight percent of said rubber particles have a capsule particle morphology and a volume average particle size of from 0.1 to 0.4 micron and from about 75 to about 20 weight percent of said particles have an entanglement particle morphology and a volume average particle size of from about 0.25 to about 1 micron, wherein said entanglement rubber particles contain, on an entanglement particle weight basis, less than 10 percent of particles having a particle diameter in excess of 1 micron; said composition having a total rubber content, stated on a 1,3-alkadiene weight basis, of from about 10 to about 25 weight percent and wherein the combined volume average particle size of the capsule morphology and entanglement morphology particles is less than 0.5 micron; said method comprising:

a. dissolving from about 5 to about 30 parts by weight of a 1,3-alkadiene/monovinylidene aromatic block copolymer rubber in from about 95 to about 70 parts by weight of a monovinylidene aromatic monomer, said block copolymer rubber being one which has from about 15 to about 40 weight percent of monovinylidene aromatic monomer copolymerized therein;

b. polymerizing the resulting rubber/monomer solution at a temperature of from about 50 to about 210° C., in the presence of from 0 to about 1000 parts per million by weight of a polymerization initiator and from 0 to about 2000 parts per million by weight of a chain transfer agent and under agitation conditions sufficient to provide capsule morphology and entanglement morphology rubber particles in the above-specified size ranges; and c. thereafter recovering the resulting rubber-modified monovinylidene aromatic polymer product.

2. The method of claim 1 wherein the monovinylidene aromatic monomer is styrene.

3. The method of claim 2 wherein the block copolymer rubber is a block copolymer of 1,3-butadiene and styrene.

4. The method of claim 3 wherein the 1,3-butadiene/styrene block copolymer has from about 20 to about 30 weight percent of styrene copolymerized therein.

5. The method of claim 1 wherein the polymerization initiator is selected from the group consisting of alkyl peroxides.

6. The method of claim 1 wherein the chain transfer agent is selected from the group consisting of alkyl mercaptans.

7. The method of claim 1 wherein from about 2 to about 15 parts by weight of a solution containing from about 5 to about 30 weight percent of a 1,3-alkadiene homopolymer or copolymer rubber dissolved in a monovinylidene aromatic monomer is added to the polymerization process as a separately added second feed stream at a point in the process subsequent to that at which the initial monomer/rubber solution has phase inverted to form the dispersed grafted and occluded rubber particles having capsule and entanglement rubber particle morphology.

8. A rubber-modified monovinylidene aromatic polymer composition which comprises, on a total composition weight basis, from about 90 to about 55 weight percent of a rigid monovinylidene aromatic polymer matrix and, dispersed within said matrix, from about 10 to about 45 weight percent of grafted and occluded 1,3-alkadiene-based rubber particles, said particles being composed, on a total grafted/occluded rubber particle weight basis, of:

a. from 25 to about 80 weight percent of rubber particles having a capsule morphology and a volume average particle size of from 0.1 to 0.4 micron;

b. from about 75 to about 20 weight percent of rubber particles having an entanglement morphology and having a volume average particle size of from about 0.25 to 1 micron, wherein said entanglement rubber particles contain, on an entanglement particle weight basis, less than 10 percent of particles having a particle diameter in excess of 1 micron and the combined volume average particle size of the capsule morphology and entanglement particle morphology particles is less than 0.5 micron; and c. from about 1 to about 25 weight percent of rubber particles having a cellular rubber particle morphology and having a volume average particle size of from about 0.6 to about 1.2 micron.

9. The polymer composition of claim 8 wherein the entanglement morphology particles constitute from 60 to about 75 weight percent of the combined weight of the entanglement and capsule morphology particles contained within said polymer composition.

10. The polymer composition of claim 8 wherein the combined volume average particle size of the capsule morphology and entanglement morphology particles is less than 0.6 micron.

11. The polymer composition of claim 8 wherein the cellular morphology particles have a volume average particle size of from about 0.8 to about 1.0 micron.

12. The polymer composition of claim 8 wherein the capsule morphology particles have a volume average particle size of from about 0.2 to about 0.35 micron.

13. The polymer composition of claim 12 wherein the entanglement morphology particles have a volume average particle size of from about 0.3 to about 0.8 microns.

* * * * *